(12) United States Patent
Nieuwoudt et al.

(10) Patent No.: US 10,258,936 B2
(45) Date of Patent: Apr. 16, 2019

(54) CONTACT TRAY FOR A MASS TRANSFER COLUMN

(71) Applicant: Koch-Glitsch, LP, Wichita, KS (US)

(72) Inventors: Izak Nieuwoudt, Wichita, KS (US); Charles A. Griesel, Bel Aire, KS (US); Clarence A. Armbrister, Bel Aire, KS (US)

(73) Assignee: Koch-Glitsch, LP, Wichita, KS (US)

( * ) Notice: Subject to any disclaimer, the term of this patent is extended or adjusted under 35 U.S.C. 154(b) by 122 days.

(21) Appl. No.: 15/200,054

(22) Filed: Jul. 1, 2016

(65) Prior Publication Data

US 2017/0007971 A1 Jan. 12, 2017

Related U.S. Application Data

(60) Provisional application No. 62/189,882, filed on Jul. 8, 2015.

(51) Int. Cl.
| | | |
|---|---|---|
| *B01F 3/04* | (2006.01) | |
| *B01D 3/16* | (2006.01) | |
| *F28C 3/06* | (2006.01) | |

(52) U.S. Cl.
CPC .......... *B01F 3/04524* (2013.01); *B01D 3/163* (2013.01); *F28C 3/06* (2013.01)

(58) Field of Classification Search
CPC ......... B01D 3/163; B01F 3/04524; F28C 3/06
USPC ...................................... 261/114.4
See application file for complete search history.

(56) References Cited

U.S. PATENT DOCUMENTS

| | | | |
|---|---|---|---|
| 2,658,737 A | 11/1953 | Nutter | |
| 2,804,935 A | 9/1957 | Hutchinson | |
| 3,573,172 A | 3/1971 | Streuber | |
| 3,693,948 A * | 9/1972 | Kloss | B01D 3/20 |
| | | | 261/114.2 |
| 3,759,497 A | 9/1973 | Black | |
| 4,060,399 A | 11/1977 | Gleason | |
| 4,382,901 A * | 5/1983 | Thomas | B01D 3/163 |
| | | | 137/512.1 |
| 4,620,952 A | 11/1986 | Hsieh | |

(Continued)

FOREIGN PATENT DOCUMENTS

| | | |
|---|---|---|
| BR | 0204953 B1 | 12/2010 |
| CA | 2096787 A1 | 11/1994 |

(Continued)

OTHER PUBLICATIONS

International Search Report and Written Opinion received for PCT Patent Application No. PCT/US2016/040783, dated Oct. 4, 2016, 13 pages.

(Continued)

*Primary Examiner* — Charles S Bushey (57) ABSTRACT

A valve contact tray for use in a mass transfer or heat exchange column and having a plurality of fixed or moveable valves distributed across a tray deck of the contact tray. Each of the valves includes an opening in the tray deck, a valve cover connected to attachment legs, and a weir surrounding the opening. The valve cover is wider than and extends outwardly beyond the underlying opening in the tray deck and has a perimeter region that extends downwardly. A louvered vent opening may be provided in a downstream one of the attachment legs.

19 Claims, 9 Drawing Sheets

(56) References Cited

U.S. PATENT DOCUMENTS

| | | |
|---|---|---|
| 4,956,127 A | 9/1990 | Binkley et al. |
| 5,106,556 A | 4/1992 | Binkley et al. |
| 5,120,474 A | 6/1992 | Binkley et al. |
| 5,147,584 A | 9/1992 | Binkley et al. |
| 5,164,125 A | 11/1992 | Binkley et al. |
| 5,192,466 A | 3/1993 | Binkley |
| 5,213,719 A | 5/1993 | Chuang |
| 5,223,183 A | 6/1993 | Mcbride |
| 5,244,604 A | 9/1993 | Miller |
| 5,262,094 A | 11/1993 | Chuang |
| 5,277,848 A | 1/1994 | Binkley et al. |
| 5,318,732 A | 6/1994 | Monkelbaan |
| 5,453,222 A | 9/1995 | Lee et al. |
| 5,480,595 A | 1/1996 | Yeoman |
| 5,547,617 A | 8/1996 | Lee et al. |
| 5,618,473 A | 4/1997 | Sauter et al. |
| 5,632,935 A | 5/1997 | Yeoman |
| 5,702,647 A | 12/1997 | Lee et al. |
| 5,762,668 A | 6/1998 | Lee et al. |
| 5,762,834 A | 6/1998 | Hauser et al. |
| 5,788,894 A | 8/1998 | Yeoman |
| 5,837,105 A | 11/1998 | Stober et al. |
| 5,885,488 A | 3/1999 | Konijn |
| 5,895,608 A | 4/1999 | Lee et al. |
| 5,911,922 A | 6/1999 | Hauser et al. |
| 5,951,827 A | 9/1999 | Breedon |
| 5,972,171 A | 10/1999 | Ross et al. |
| 6,003,847 A | 12/1999 | Lee et al. |
| 6,053,484 A | 4/2000 | Fan |
| 6,059,934 A | 5/2000 | Stober et al. |
| 6,076,813 A | 6/2000 | Yeoman |
| 6,089,550 A | 7/2000 | Petschauer et al. |
| 6,224,043 B1 | 5/2001 | Fan |
| 6,270,062 B1 | 8/2001 | Chuang et al. |
| 6,565,071 B2 | 5/2003 | Chuang et al. |
| 6,575,438 B2 | 6/2003 | Nutter et al. |
| 6,592,106 B1 | 7/2003 | Eaton, Jr. |
| 6,629,687 B1 | 10/2003 | Gage |
| 6,736,378 B2 | 5/2004 | Colic et al. |
| 6,799,752 B2 * | 10/2004 | Wu .................. B01D 3/163 261/114.2 |
| 6,817,596 B2 | 11/2004 | Fischer |
| 6,877,725 B2 | 4/2005 | Buchanan et al. |
| 6,966,548 B2 | 11/2005 | Buchanan et al. |
| 6,994,331 B2 | 2/2006 | Coney |
| 7,028,995 B2 | 4/2006 | Weiland et al. |
| 7,055,810 B2 | 6/2006 | Gage |
| 7,540,476 B2 * | 6/2009 | Pilling .................. B01D 3/163 261/114.4 |
| 8,006,716 B2 * | 8/2011 | Zhang .................... B01D 3/163 137/512.2 |
| 8,191,870 B2 | 6/2012 | Nieuwoudt et al. |
| 8,480,062 B2 | 7/2013 | Kim |
| 8,517,354 B1 | 8/2013 | Binkley |
| 8,720,870 B2 | 5/2014 | Pilling et al. |
| 8,944,419 B2 * | 2/2015 | Pilling .................. B01D 3/163 261/114.4 |
| 9,199,206 B2 * | 12/2015 | Pilling ................ B01F 3/04524 |
| 2004/0130041 A1 | 7/2004 | Resetarits et al. |
| 2007/0262022 A1 | 11/2007 | Mosler et al. |
| 2008/0277260 A1 | 11/2008 | Binkley |
| 2011/0278745 A1 | 11/2011 | Pilling et al. |
| 2016/0038851 A1 | 2/2016 | Binkley |
| 2017/0007943 A1 * | 1/2017 | Nieuwoudt ........... B23P 15/001 |

FOREIGN PATENT DOCUMENTS

| | | |
|---|---|---|
| CN | 2260933 Y | 8/1997 |
| CN | 1037747 C | 3/1998 |
| CN | 1275673 C | 9/2006 |
| CN | 203075687 U | 7/2013 |
| EP | 0626185 B1 | 11/1996 |
| EP | 1317948 A1 | 6/2003 |
| JP | 4623926 B2 | 2/2011 |
| MX | PA03011497 A | 3/2004 |
| MX | PA02011993 A | 7/2004 |
| RU | 2233193 C1 | 7/2004 |
| WO | 99/19110 A2 | 4/1999 |

OTHER PUBLICATIONS

Written Opinion received for corresponding Singapore Patent Application No. 11201710794W, dated Nov. 22, 2018, 5 pages.

Examination Report received for corresponding GCC Patent Application No. 31658, dated Nov. 15, 2018, pages.

* cited by examiner

CONTACT TRAY FOR A MASS TRANSFER COLUMN

BACKGROUND OF THE INVENTION

The present invention relates generally to columns in which mass transfer and heat exchange occur and, more particularly, to contact trays for use in such columns to facilitate interaction between fluid streams flowing within the columns.

As used herein, the term "mass transfer column" refers to a column in which mass transfer and/or heat exchange occur. Examples of mass transfer columns include distillation, absorption, stripping, and extraction columns.

Various types of trays are commonly used in mass transfer columns to promote contact and mass transfer between ascending and downwardly flowing fluid streams. The ascending fluid is typically vapor and the descending fluid is typically liquid, although liquid-liquid and gas-liquid systems are also known. Each tray normally extends horizontally across substantially the entire horizontal cross section of the column and is supported around its perimeter by a ring welded to the inner surface of the circular column wall or shell. A number of trays are positioned in this manner with a uniform vertical spacing between adjacent trays. The trays may be located in only a portion of the column to perform one part of a multi-step process occurring with the column. Alternatively, the trays may fill substantially the entire open area within the column.

Trays of the type described above contain one or more downcomers that are positioned at openings in the tray deck to provide passageways for liquid to descend from one tray to an adjacent lower tray. Prior to entering the downcomer, the liquid on the tray deck interacts with ascending vapor that passes through openings provided in selected portions of the tray deck. Those areas of the tray deck containing vapor openings are commonly referred to as "active" areas because of the vapor and liquid mixing and frothing that occurs above those areas of the tray.

The vapor openings in the tray deck can be simple sieve holes or can be formed as part of fixed or moveable valves. Conventional valves have valve covers supported over the opening in the tray deck by attachment legs. In fixed valves, the valve cover is fixed against vertical movement. In moveable valves, the valve cover is able to move up and down in response to variations in vapor or fluid flow rates through the opening. The valve cover functions to shield the opening in both the fixed and moveable valves against undesirable weeping of fluid downwardly through the opening and to laterally direct the vapor or other fluid that has ascended through the opening for enhanced interaction with the fluid flowing along the tray deck. While a variety of fixed and moveable valves are known, further improvements in their design and performance are desired.

SUMMARY OF THE INVENTION

In one aspect, the present invention is directed to a contact tray for use in a mass transfer column. The contact tray comprises a generally planar tray deck and a plurality of valves distributed across the tray deck. Each of the valves comprises an opening that extends through the tray deck to allow for passage of fluid through the tray deck, a weir extending upwardly from the tray deck around a perimeter of the opening, and a valve cover supported by attachment legs above said opening and said weir. The valve cover extends outwardly beyond the entire perimeter of the opening and has a downwardly extending perimeter region.

In another aspect, the present invention is directed to a contact tray for use in a mass transfer column. The contact tray comprises a generally planar tray deck and a plurality of valves distributed across the tray deck. Each of the valves comprises an opening that extends through the tray deck to allow for passage of fluid through the tray deck, a weir extending upwardly from the tray deck around an entire perimeter of the opening, a valve cover supported above said opening and said weir by first and second attachment legs positioned at opposite ends of said valve cover, and a vent opening formed in one of said attachment legs. The valve cover extends outwardly beyond the entire perimeter of the opening and has a downwardly extending perimeter region.

In a further aspect, the present invention is directed to a contact tray for use in a mass transfer column. The contact tray comprises a generally planar tray deck and a plurality of valves distributed across the tray deck. Each of the valves comprises an opening that extends through the tray deck to allow for passage of fluid through the tray deck, a weir extending upwardly from the tray deck around an entire perimeter of the opening, a valve cover supported above said opening and said weir by first and second attachment legs positioned at opposite ends of said valve cover, and a vent opening formed in one of said attachment legs. The opening in the tray deck is circular and the valve cover is in the form of an isosceles trapezoid. The attachment legs comprise first and second attachment legs respectively connected to opposed parallel first and second ends of the valve cover. The valve cover each extends outwardly beyond the entire perimeter of the opening in the tray deck and the first attachment leg has a width greater than a largest width of the opening. The valve cover has a downwardly extending perimeter region.

BRIEF DESCRIPTION OF THE DRAWINGS

In the accompanying drawings that form part of the specification and in which like reference numerals are used to indicate like components in the various views.

DETAILED DESCRIPTION

Figure 1:
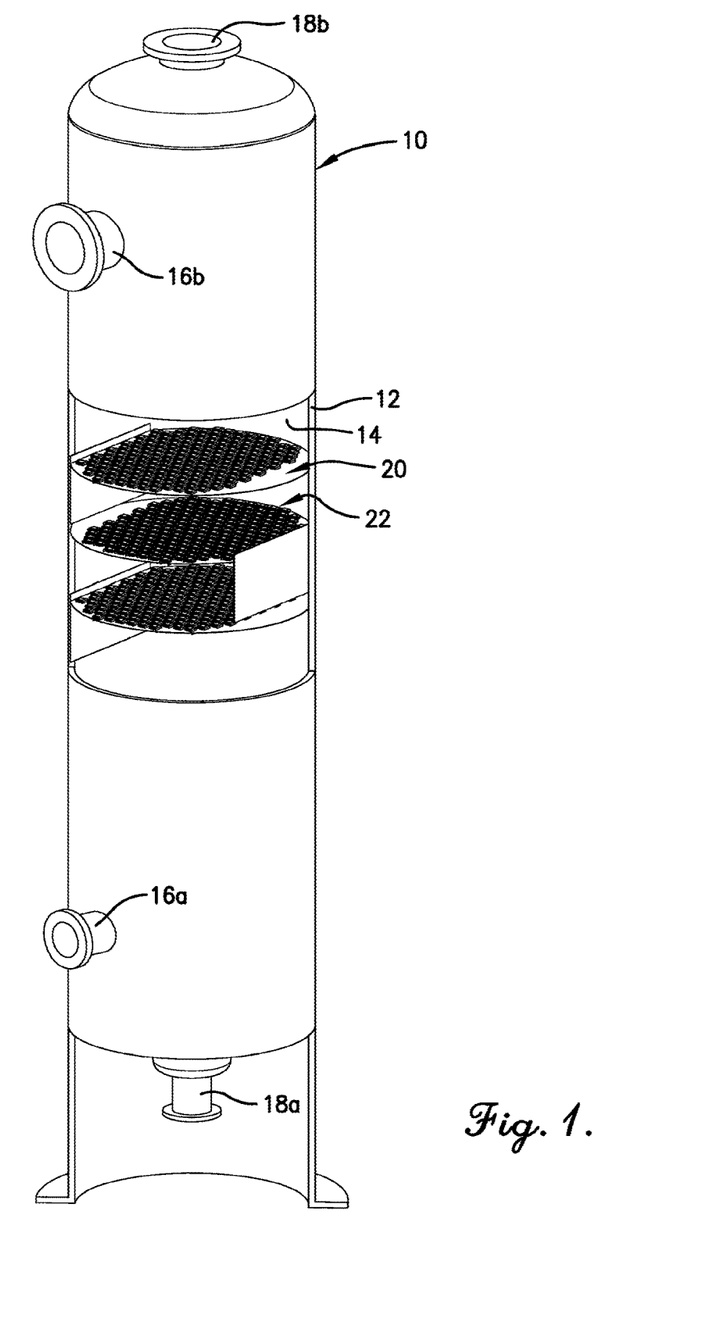
FIG. 1 is a fragmentary, perspective view of a column in which mass transfer and/or heat exchange are intended to occur and in which a portion of a shell of the column is broken away to show one embodiment of fixed valve contact trays of the present invention.

Turning now to the drawings in greater detail and initially to FIG. 1, a mass transfer column suitable for use in mass transfer or heat exchange processes is represented generally by the numeral 10. The column 10 may include an upright, external shell 12 that may be generally cylindrical in configuration, although other configurations, including polygonal, are possible and are within the scope of the present invention. The shell 12 may be of any suitable diameter and height and may be constructed from one or more rigid materials that are desirably inert to, or are otherwise compatible with, the fluids and conditions present during operation of the column 10.

The column 10 may be of a type used for processing fluid streams, typically liquid or vapor streams, to obtain fractionation products or to otherwise cause mass transfer or heat exchange between the fluid streams. For example, the column 10 may be one in which crude atmospheric, lube vacuum, crude vacuum, fluid or thermal cracking fractionating, coker or visbreaker fractionating, coke scrubbing, reactor off-gas scrubbing, gas quenching, edible oil deodorization, pollution control scrubbing, or other processes occur.

The shell 12 of the column 10 defines an open internal region 14 in which the desired mass transfer or heat exchange between the fluid streams occurs. In one implementation, the fluid streams may comprise one or more ascending vapor streams and one or more descending liquid streams. In other implementations, the fluid streams may comprise substantially any combination of ascending or descending liquid streams or ascending or descending vapor streams.

One or more fluid streams may be directed into the column 10 through any number of feed lines 16, such as lower feed lines 16a or upper feed lines 16b, positioned at appropriate locations along the height of the column 10. In one implementation, vapor streams may be generated within the column 10 rather than being introduced into the column 10 through the feed lines 16a, 16b. One or more fluid streams may be directed out of the column 10 through any number of takeoff lines 18, such as lower takeoff line 18a and upper takeoff line 18b. In one implementation, liquid may be introduced through upper feed line 16b, descend through the column 10, and be removed through lower takeoff line 18a, while vapor may be introduced through lower feed line 16a, ascend through the column 10, and be removed through upper takeoff line 18b.

Other column components that would typically be present, such as reflux stream lines, reboilers, condensers, vapor horns, liquid distributors, and the like, are not illustrated in the figures because they are conventional in nature and an illustration of these components is not believed to be necessary for an understanding of the present invention.

In accordance with the present invention, a plurality of pairs of fixed-valve contact trays 20 and 22 is positioned within the open internal region 14 of the column 10 to facilitate interaction of the fluids flowing within the open internal region 14. The trays 20 and 22 extend generally horizontally across the entire cross-section of the column 10 and are arranged in an alternating fashion such that each tray 20 overlies and is vertically adjacent to one of the trays 22. The specific design of each tray 20 and 22 can be varied while remaining within the scope of the present invention.

Figure 2:
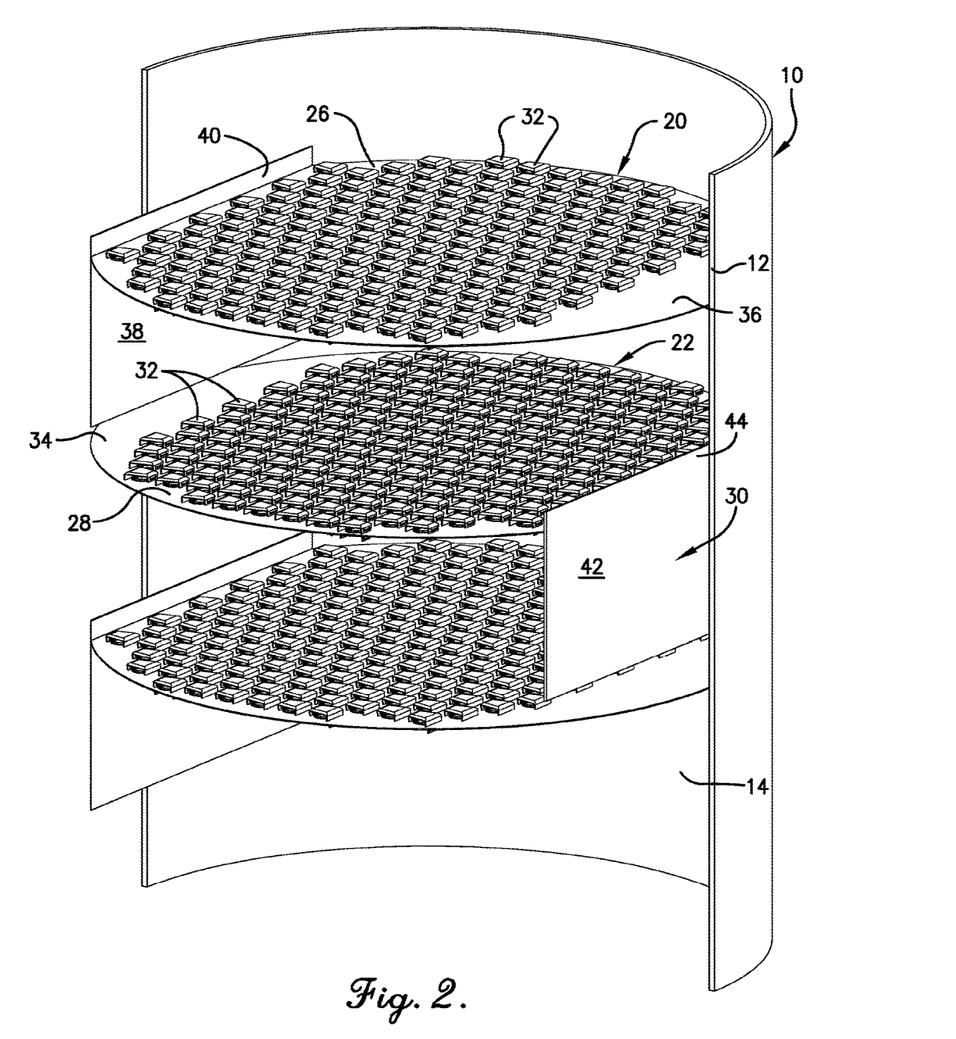
FIG. 2 is an enlarged, perspective view of the contact trays in the column shown in FIG. 1.

In the illustrated embodiment of FIGS. 1-2, the trays 20 and 22 are constructed to form a single-pass fluid flow arrangement in which the descending fluid flows from end-to-end opposite flow directions on each tray 20 and 22. Each tray 20 has a side downcomer 24 that is positioned at one end of a tray deck 26 that is normally formed from interconnected tray panels. The side downcomer 24 receives and removes the descending fluid from the tray deck 26 and delivers it to one end of a tray deck 28 of a paired underlying tray 22. The fluid then flows across the tray deck 28 in an opposite direction to a side downcomer 30 that is positioned at an opposite end of the tray deck 28. The fluid enters the side downcomer 30 and is delivered to the tray deck 26 of the next underlying tray 20. This flow pattern is repeated on each of the lower pairs of trays 20 and 22. Although the trays 20 and 22 are illustrated as being constructed for single-pass fluid flow, the invention encompasses trays constructed for multi-pass flow.

Fixed valves 32 are positioned in a preselected pattern on some portions of the tray decks 26 and 28 of the trays 20 and 22 to allow vapor or another fluid to ascend through the tray decks 26 and 28 and interact with flowing across the upper surface of the tray decks 26 and 28. The area of the tray decks 26 and 28 containing these fixed valves 32 is normally referred to as the active area of the trays 20 and 22.

The area of the tray deck 28 underlying the side downcomer 24 of the overlying tray 20 comprises an inlet panel 34 and is normally imperforate or has shielded flow passages that impede or prevent the descending fluid from passing through the inlet panel 34. Similarly, the area of the tray deck 26 underlying the side downcomer 30 of the overlying tray 22 comprises an inlet panel 36 that is imperforate or has shielded flow passages.

The side downcomer 24 of each tray 20 comprises a wall 38 that extends in a chordal fashion across the open internal region 14 of the column 10. The upper portion of the wall 38, or a separate piece attached to the wall 38, extends upwardly above the tray deck 26 to form an inlet weir 40 that causes liquid to accumulate on the tray deck 26 before spilling over the weir 40 and entering the side downcomer 24. A lower portion of the wall 38 is spaced above the underlying tray deck 28 or contains flow openings (not shown) to allow fluid to exit the side downcomer 24 and flow along the upper surface of the tray deck 28 before entering the side downcomer 30 at the opposite end of the tray deck 26.

Similarly, the side downcomer 30 on each tray 22 comprises a chordal wall 42 that has a lower portion that is spaced above the underlying tray deck 26 or contains flow openings (not shown) to allow fluid the exit the side downcomer 30 and flow along the upper surface of the tray deck 26. An upper portion of the wall 42, or a separate piece attached to the wall 42, extends upwardly above the tray deck 28 to form an inlet weir 44. While each of walls 38 and 42 is illustrated as planar and vertically-extending, stepped, sloped or multi-chordal walls or other constructions are within the scope of the invention.

Turning now to FIGS. 3-11, each of the fixed valves 32 on tray deck 26 comprises an opening 46 that extends through the tray deck 26 to allow for passage of fluid through the tray deck 26 and a weir 48 extending upwardly from the tray deck 26 a preselected distance along an entire perimeter of the opening 46. Each fixed valve 32 also includes a valve cover 50 supported by first and second attachment legs 52 and 54 at a fixed, preselected location above the opening 46. While two attachment legs 52 and 54 are used in the illustrated embodiment to support the valve cover 48, additional attachment legs could be used if desired.

The attachment legs 52 and 54 in the illustrated embodiment extend upwardly from the tray deck 26 and are located at opposite ends of the valve cover 50. The attachment legs 52 and 54 are shown as extending generally perpendicularly to the tray deck 26, but they may in other embodiments slope toward or away from each other. Each of the attachment legs 52 and 54 has an upper end that is attached to and is integral with an edge of the valve cover 50.

The attachment legs 52 and 54 are fixed to the tray deck 26 in a suitable fashion. In the illustrated embodiment, the attachment legs 52 and 54 extend downwardly through parallel slots 56 and 58 (FIG. 3), respectively, positioned on opposite sides of the opening 46 in the tray deck 26. Each of the attachment legs 52 and 54 includes a pair of shoulders 60 and 62, respectively, that engage against an upper surface of the tray deck 26 and a locking tab 64 that has an upper surface spaced a preselected distance below the shoulders 60 and 62. The locking tab 64 engages against an under surface of said tray deck 26. The distance between the shoulders 60 and 62 and the upper surface of the tab 64 is selected to prevent vertical movement of the attachment legs 60 and 62, and valve cover 50 carried thereon, when the shoulders 60 and 62 of the attachment legs 52 and 54 engage the upper surface of the tray deck 26 and the upper surfaces of said locking tabs 64 engage against the under surface of the tray deck 26. If desired, the distance between the shoulders 60 and 62 and the upper surface of the locking tab 64 can be increased to allow some vertical movement of the attachment legs 52 and 54 and valve cover 50 in response to variations in upward pressure exerted on the under surface of the valve cover 50 by the fluid ascending through the openings 46 in the tray deck 26.

Figure 3:
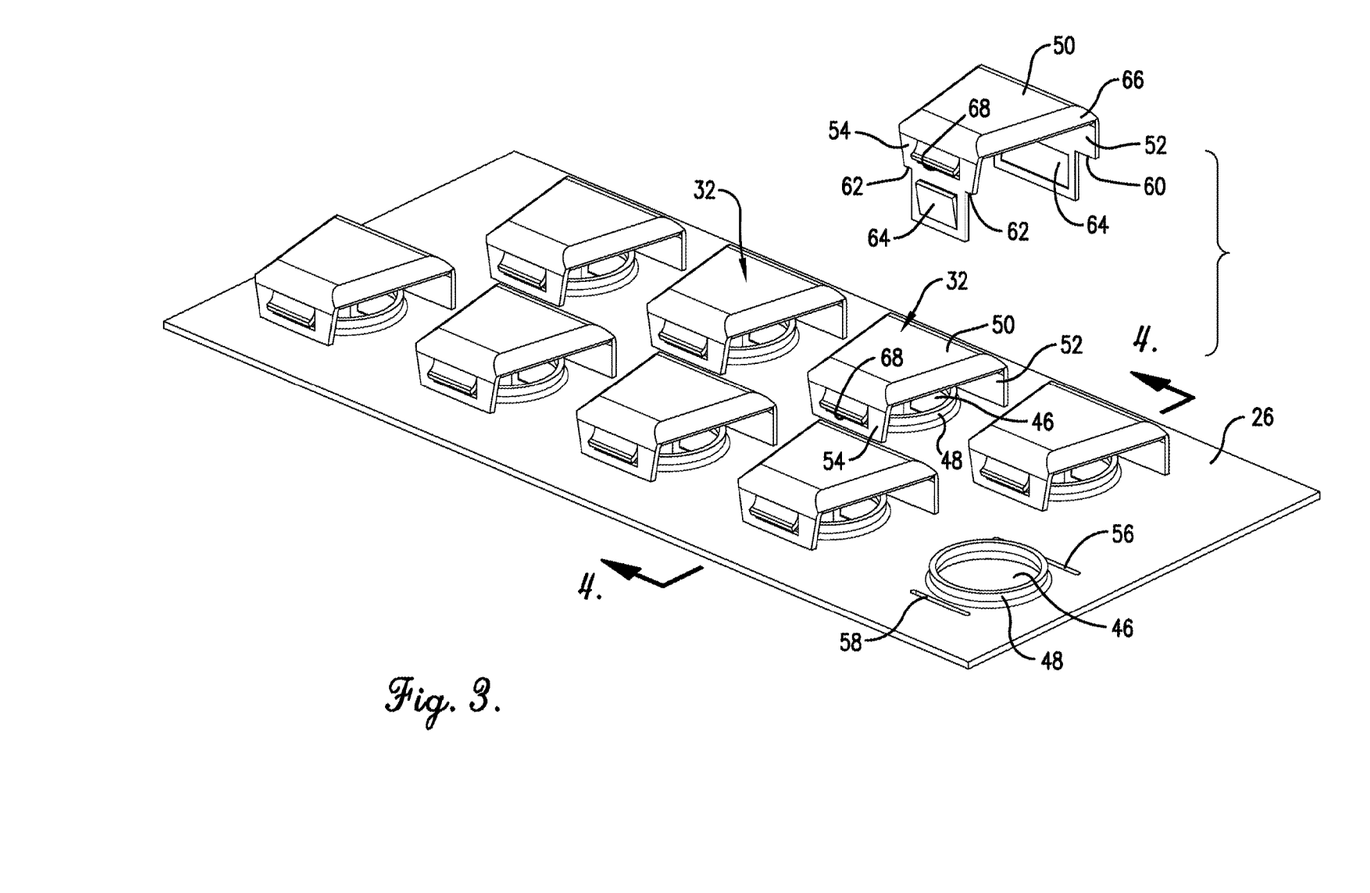
FIG. 3 is a fragmentary, perspective and partially exploded view of one of the contact trays of FIGS. 1 and 2, showing fixed valves of the contact tray on a further enlarged scale with one of the valve covers removed to show details of construction.

The locking tab 64 can be of various suitable forms that allow the attachments legs 52 and 54 to be inserted downwardly through the slots 56 and 58 before the upper surface of the locking tab 64 is positioned to engage against an under surface of the tray deck 26. For example, the locking tab 64 can simply be manually bent to bring its upper surface into engagement with the under surface of the tray deck 26 following installation of the attachment legs 52 and 54. In the illustrated embodiment, the locking tab 64 is formed in the associated attachment leg 52 or 54 by cutting along two sides and an upper edge of the locking tab 64 while leaving a lower edge of the locking tab 64 attached to the attachment leg 52 or 54. The locking tab 64 is then bent about the attached lower edge to move the remainder of the locking tab 64 out of the plane of the associated attachment leg 52 or 54. When the attachment leg 52 or 54 is inserted downwardly through the associated slot 56 or 58, the portions of the tray deck 26 surrounding the slot 56 or 58 cause the locking tab 64 to pivot toward the plane of the attachment leg 52 or 54. The locking tab 64 then springs outwardly once the locking tab 64 clears the slot 56 or 58.

Attachment leg 52 has a width that is greater than a largest corresponding width of the opening 46 in the tray deck 26 to shield the opening 46 against unwanted weeping of fluid downwardly through the opening 46. The fixed valve 32 is oriented on the tray deck 26 so that the attachment legs 52 and 54 are aligned in the general direction of fluid flow along the upper surface of the tray deck 26, with the attachment leg 52 located at the upstream side of the fixed valve 32. The upstream attachment leg 52 in one embodiment is greater than that of the attachment leg 54 to facilitate a more streamlined flow of fluid around the opening 46.

The valve cover 50, in one embodiment, is in the form of an isosceles trapezoid with the attachment legs 52 and 54 connected to opposed parallel first and second ends of the valve cover 50. The valve cover 50 may alternatively be formed with other shapes. The valve cover 50 is dimensioned to extend outwardly beyond the entire perimeter of the opening 46 in the tray deck 26 to more effectively shield the opening 46 against the detrimental downward weeping of fluid through the opening 46 and has a downwardly-extending outer perimeter region 66. The valve cover 50 (except at the perimeter region 66) lies in a plane that is parallel to that of the tray deck 26. In other embodiments, the valve cover 50 may be inclined, such as in an upward direction in the general direction of fluid flow on the upper surface of the tray deck 26.

Figure 4:
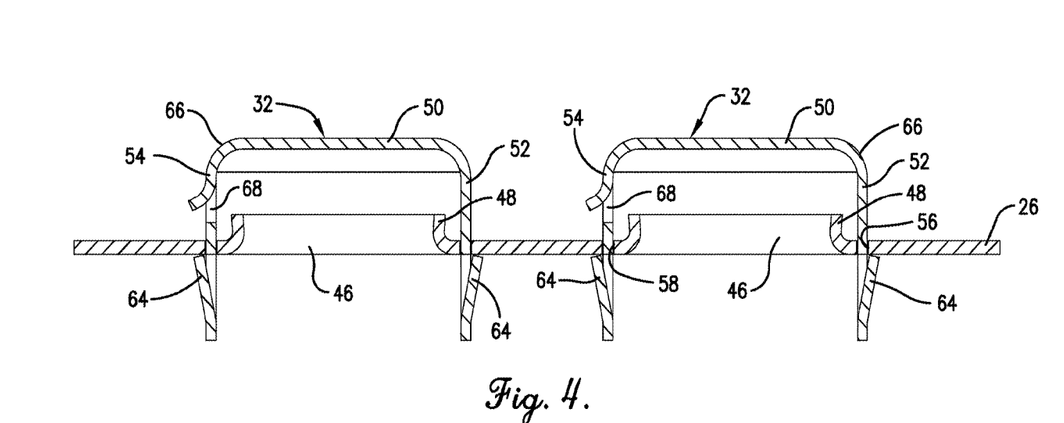
FIG. 4 is a fragmentary, side elevation view of one of the contact trays showing two of the fixed valves taken in vertical section along line 4-4 of FIG. 3 in the direction of the arrows.
Figure 5:
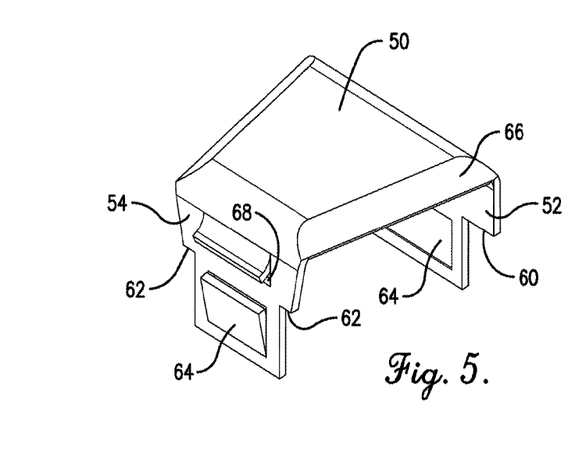
FIG. 5 is a top perspective view of one of the valve covers for the fixed valve.
Figure 6:
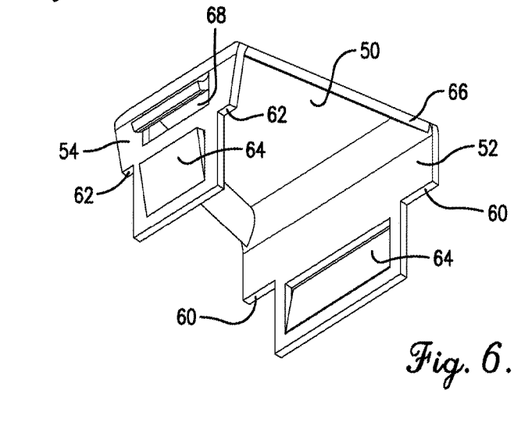
FIG. 6 is a bottom perspective view of the valve cover shown in FIG. 5.
Figures 7, 8, 9, 10, 11:
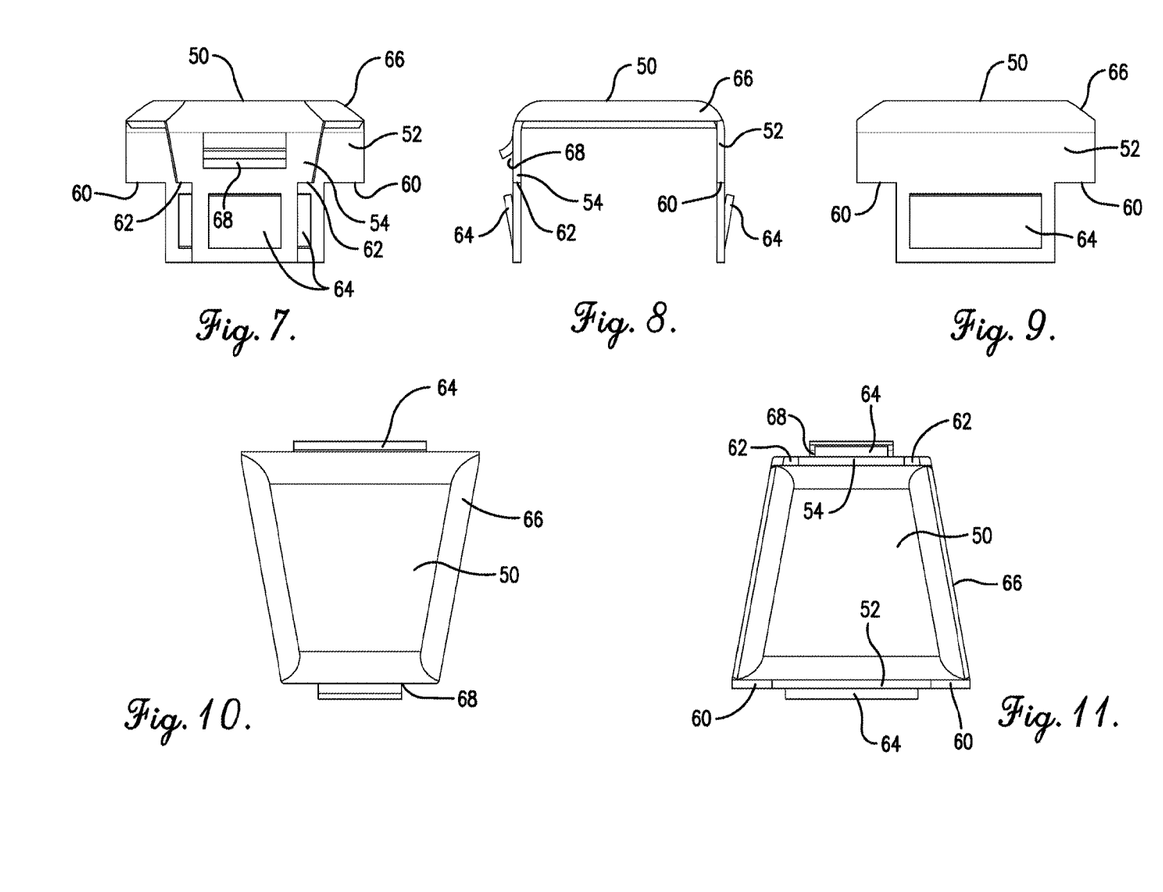
FIG. 7 is an end elevation view of the valve cover shown in FIG. 5 taken in the direction from a second end to a first end of the valve cover.
FIG. 8 is a side elevation view of the valve cover shown in FIG. 5.
FIG. 9 is an end elevation view of the valve cover shown from the opposite end of the view in FIG. 7.
FIG. 10 is a top plan view of the valve cover shown in FIG. 5.
FIG. 11 is a bottom plan view of the valve cover shown in FIG. 5.

The downstream attachment leg 54 in each fixed valve 32 includes a louvered vent opening 68 directed in the downstream fluid-flow direction away from the upstream attachment leg 52. The vent opening 68 allows fluid ascending through the opening 46 in the fixed valve 32 to vent through the attachment leg 54 to facilitate intermixing with the fluid flowing along the upper surface of the tray deck 26 and to provide a directional push to the flowing fluid. Each of the fixed valves 32 on tray deck 28 are of the same construction as those described above on the tray deck 26.

Figure 21:
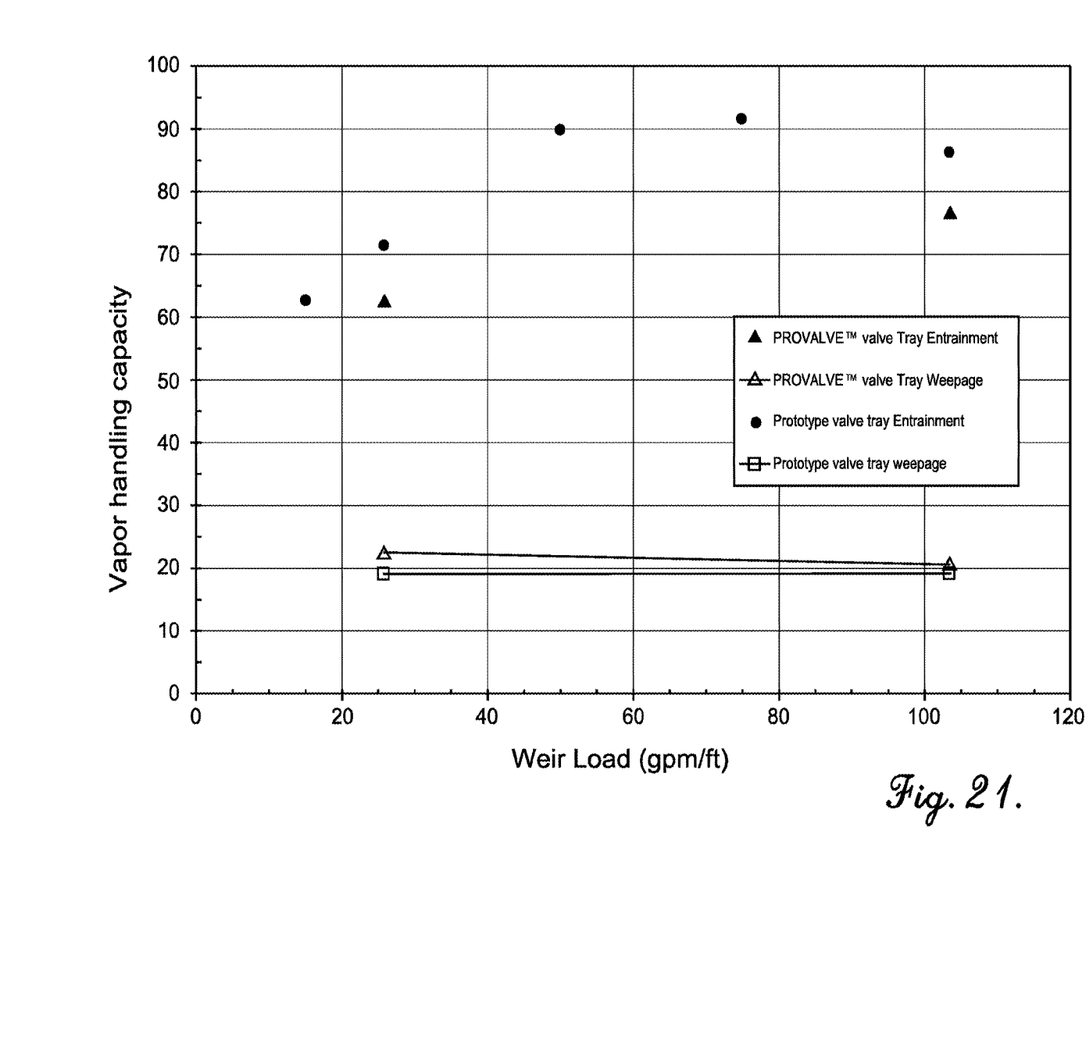
FIG. 21 is a graph showing the comparative performance of a fixed valve contact tray of the present invention against a fixed valve contact tray lacking the inventive features.

It has been found through comparative testing that the fixed valves 32 reduce the entrainment of liquid in the vapor ascending through the fixed valves 32 and decrease the weeping of liquid downwardly through the fixed valves 32 in comparison to conventional PROVALVE™ fixed valves that are of similar construction but lack the downturned perimeter region 66 of the valve cover 50, the weir 48 surrounding the opening 46, and the vent opening 68 formed in the downstream attachment leg 54. The results of the comparative testing are set forth in FIG. 21.

Turning to FIGS. 12-20, moveable valves 132 having many of the same structural features as fixed valves 32 are illustrated in a tray deck 126. For ease of reference, the prefix "1" is used with the reference numerals for components of the moveable valves 132 that generally correspond to those of the fixed valves 32. The moveable valves 132 each comprise an opening 146 that extends through the tray deck 126 and a weir 148 extending upwardly from the tray deck 126 a preselected distance along an entire perimeter of the opening 146.

Figure 12:
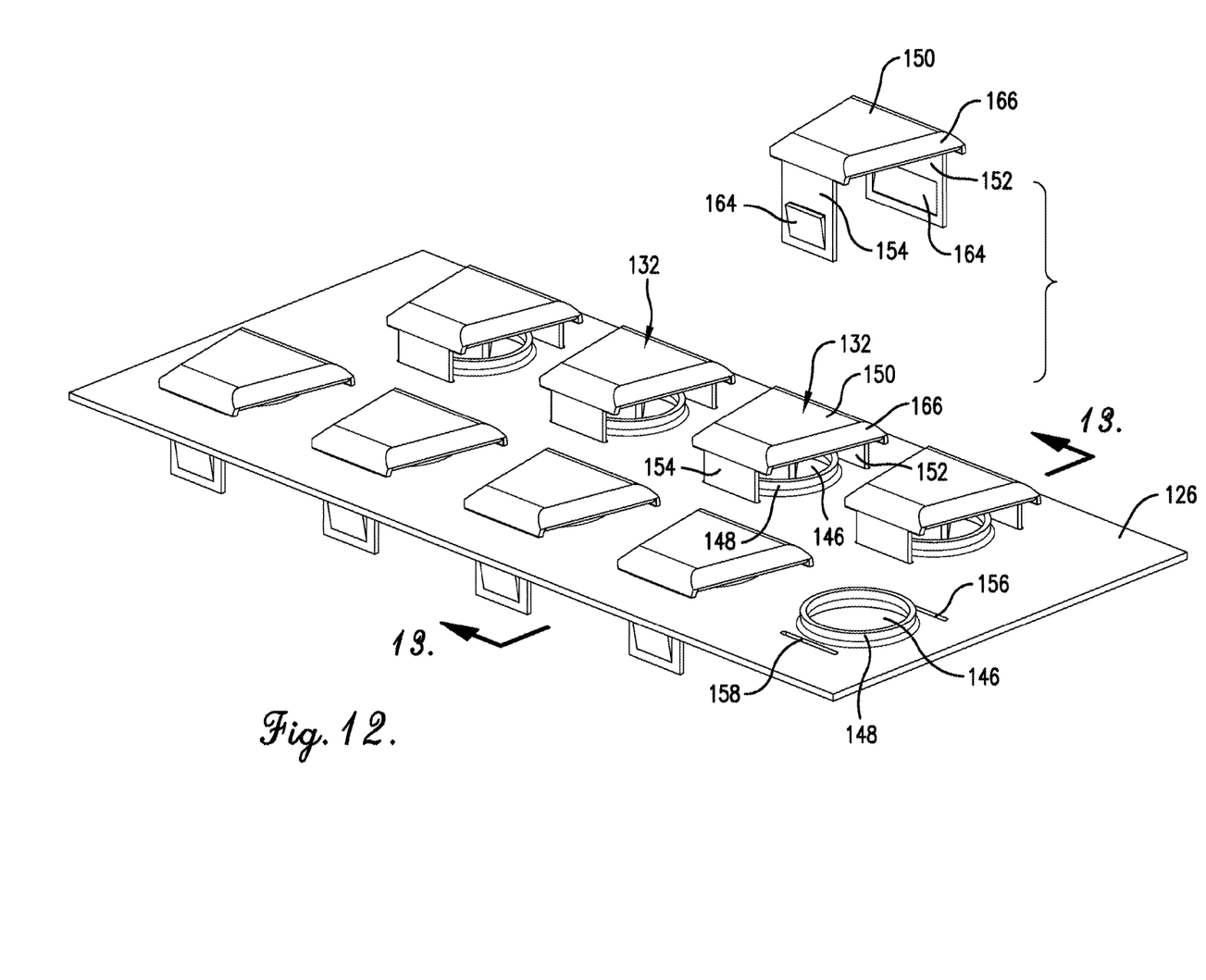
FIG. 12 is a fragmentary, perspective and partially exploded view of another embodiment of one of the contact trays containing moveable valves with one of the valve covers being removed to show details of construction.

In each fixed valve 132, a valve cover 150 is attached to first and second attachment legs 152 and 154. While two attachment legs 152 and 154 are used in the illustrated embodiment, additional attachment legs could be used if desired.

Figure 13:
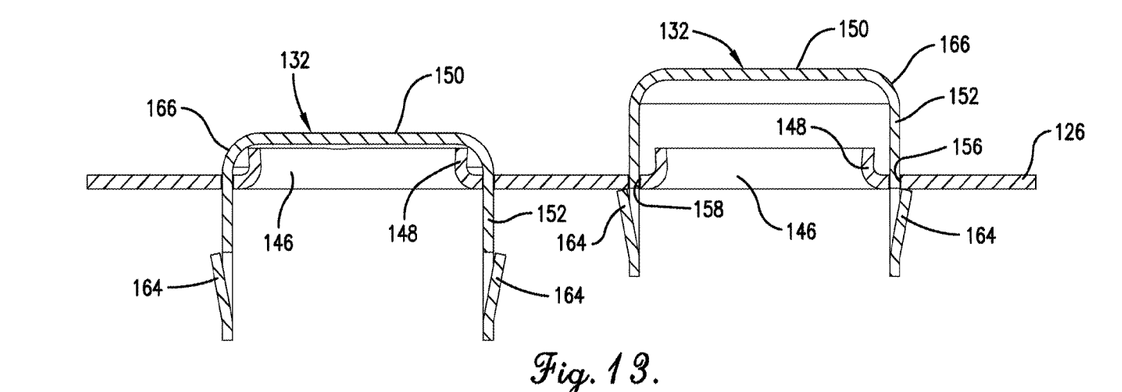
FIG. 13 is a fragmentary, elevation view of the contact tray of FIG. 12 showing two of the moveable valves taken in vertical section along line 13-13 of FIG. 12 in the direction of the arrows.
Figure 14:
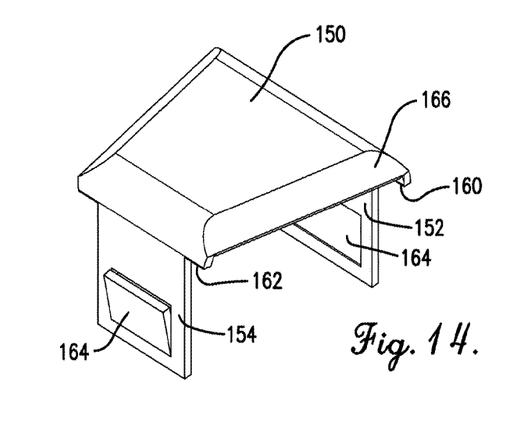
FIG. 14 is a fragmentary, side elevation view of one of the contact trays showing two of the moveable valves taken in vertical section along line 4-4 of FIG. 3 in the direction of the arrows.
Figure 15:
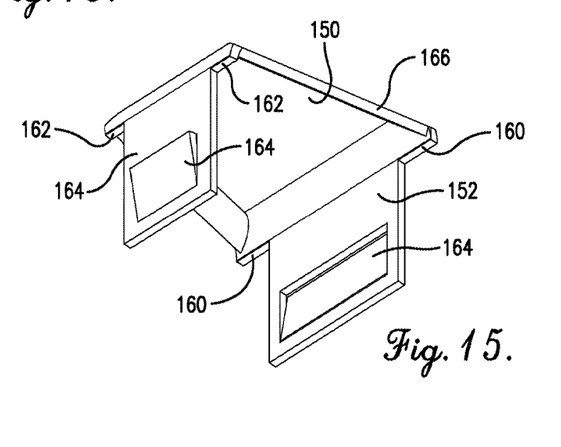
FIG. 15 is a top perspective view of one of the valve covers for the moveable valve.
Figure 16:
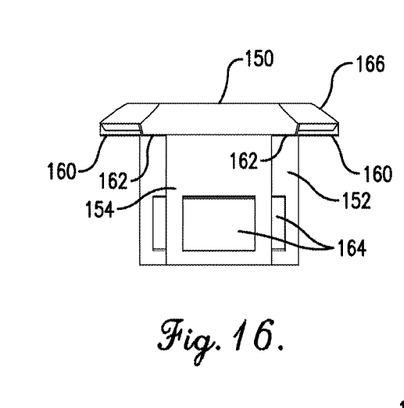
FIG. 16 is a bottom perspective view of the valve cover shown in FIG. 15.
Figure 17:
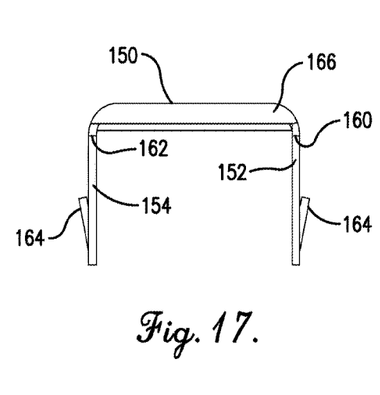
FIG. 17 is an end elevation view of the valve cover shown in FIG. 15 taken in the direction from a second end to a first end of the valve cover.
Figure 18:
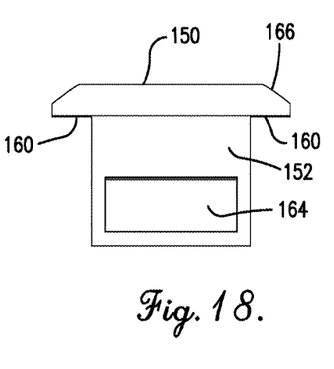
FIG. 18 is a side elevation view of the valve cover shown in FIG. 15.
Figure 19:
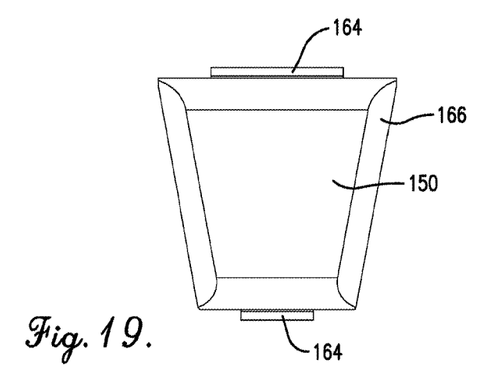
FIG. 19 is an end elevation view of the valve cover shown from the opposite end of the view in FIG. 17.
Figure 20:
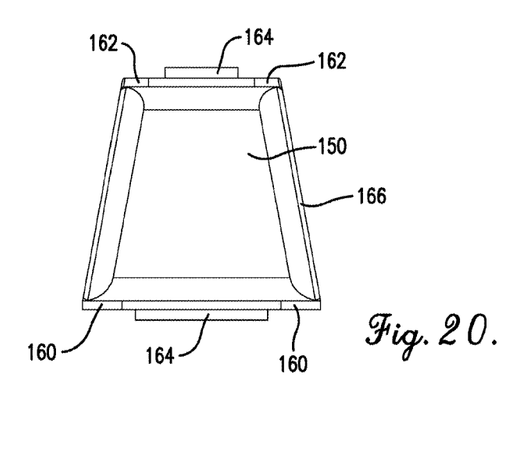
FIG. 20 is a top plan view of the valve cover shown in FIG. 15.

The attachment legs 152 and 154 are located at opposite ends of the valve cover 150 and extend perpendicularly to the tray deck 126. Each of the attachment legs 152 and 154 has an upper end that is attached to and is integral with an edge of the valve cover 150. The attachment legs 152 and 154 extend downwardly through parallel slots 156 and 158 (FIG. 12), respectively, positioned on opposite sides of the opening 146 in the tray deck 126. Each of the attachment legs 152 and 154 includes a locking tab 164 that has an upper surface spaced a preselected distance below the valve cover 150. The locking tab 164 engages against an under surface of said tray deck 126 to fix the upper limit of upward movement of the valve cover 150. Engagement of the under surface of valve cover 150 on an upper edge of the weir 48 sets the lower limit of downward movement of the valve cover 150. Alternatively, shoulders 160 and 162 such as shoulders 60 and 62 used with attachment legs 52 and 54 described above may be used to set the lower limit of downward movement. The distance between the locking tab 164 and the under surface of the valve cover 150 is selected to set the range of the vertical distance of movement of the attachment legs 160 and 162 and the valve cover 150 carried thereon in response to variations in upward pressure exerted on the under surface of the valve cover 150 by the fluid ascending through the openings 146 in the tray deck 126. For illustration purposes, the right-hand moveable valve 132 in FIG. 13 is shown in its fully-open position and the left-hand moveable valve 132 in that figure is shown in its closed position.

The locking tab 164 can be of various suitable forms that allow the attachments legs 152 and 154 to be inserted downwardly through the slots 156 and 158 as described above with reference to locking tab 64.

Attachment leg 152 has a width that is greater than a largest corresponding width of the opening 146 in the tray deck 126 to shield the opening against unwanted weeping of fluid downwardly through the opening 146. The moveable valves 132 are oriented on the tray deck 126 so that the attachment legs 152 and 154 are aligned in the general direction of fluid flow along the upper surface of the tray deck 126, with the attachment leg 152 located at the upstream side of the moveable valve 132. The upstream attachment leg 152 in one embodiment is greater than that of the attachment leg 154 to facilitate a more streamlined flow of fluid around the opening 146.

The valve cover 150, in one embodiment, is in the form of an isosceles trapezoid with the attachment legs 152 and 154 connected to the opposed parallel first and second ends of the valve cover 150. The valve cover 150 may alternatively be formed with other shapes. The valve cover 150 is dimensioned to extend outwardly beyond the entire perimeter of the opening 146 in the tray deck 126 to more effectively shield the opening 146 against the detrimental downward weeping of fluid through the opening 146 and has a downwardly-extending outer perimeter region 166. The valve cover 150 (except at the perimeter region 166) lies in a plane that is parallel to that of the tray deck 126. In other embodiments, the valve cover 150 may be inclined, such as in an upward direction in the general direction of fluid flow on the upper surface of the tray deck 126.

The downstream attachment leg 154 in each moveable valve 132 may differ from the downstream attachment leg 54 in the fixed valve 32 by omitting the louvered vent opening 68 or substituting a simple opening in place of the louvered vent opening 68. Alternatively, a louvered vent opening 68 may be included, such as in an embodiment in which the shoulders described above are used to set the lower limit of the downward movement of the valve cover 150. In such an embodiment, the louvered vent opening would be positioned above the shoulders so that it does not impede the downward movement of the attachment leg 154 in its associated slot 158.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A contact tray for use in a mass transfer column, said contact tray comprising:
    a generally planar tray deck; and
    a plurality of valves distributed across the tray deck, each of said valves comprising an opening that extends through the tray deck to allow for passage of fluid through the tray deck, a weir extending upwardly from the tray deck around a perimeter of the opening, and a valve cover supported by attachment legs above said opening and said weir,
    wherein said attachment legs comprise first and second attachment legs aligned at opposite ends of said valve cover,
    wherein said valve cover extends outwardly beyond the entire perimeter of said opening and has a downwardly extending perimeter region encompassing an entire perimeter of said valve cover.

2. The contact tray as set forth in claim 1, wherein said valves are fixed valves and said attachment legs support said valve cover at a fixed location above said opening and said weir.

3. The contact tray as set forth in claim 1, wherein each of said attachment legs extends through a slot in said tray deck and includes a shoulder that engages against an upper surface of said tray deck and a tab that has an upper surface spaced a preselected distance from said shoulder that engages against an under surface of said tray deck, wherein said preselected distance between said shoulder and said upper surface of the tab is selected to prevent vertical movement of said attachment legs and valve cover when the shoulders of the attachment legs engage the upper surface of the tray deck and said upper surfaces of said tabs engage against the under surface of the tray deck.

4. The contact tray as set forth in claim 1, wherein each of said attachment legs extends through and is vertically moveable within a slot in said tray deck to allow said valve cover to move between lowered and raised vertical positions, wherein each of said attachment legs includes a tab that has an upper surface that engages against an under surface of said tray deck to prevent further vertical movement of the attachment leg when the valve cover is in the raised vertical position.

5. The contact tray as set forth in claim 4, wherein an under surface of said tray cover contacts said weir when the valve cover is in the lowered position.

6. The contact tray as set forth in claim 1, wherein said opening is circular and said valve cover is in the form of an isosceles trapezoid with said attachment legs comprising first and second attachment legs respectively connected to opposed parallel first and second ends of said valve cover.

7. The contact tray as set forth in claim 6, wherein said first attachment leg is wider than said largest dimension of the opening and is located at an upstream side of said valve cover, and wherein said second attachment leg is less wide than said first attachment leg and is located at a downstream side of said valve cover.

8. The contact tray as set forth in claim 7, wherein said second attachment leg has a vent opening formed therein, and a louver overhanging said vent opening.

9. A contact tray for use in a mass transfer column, said contact tray comprising:
a generally planar tray deck; and
a plurality of valves distributed across the tray deck, each of said valves comprising an opening that extends through the tray deck to allow for passage of fluid through the tray deck, a weir extending upwardly from the tray deck around an entire perimeter of the opening, a valve cover supported above said opening and said weir by first and second attachment legs positioned at opposite ends of said valve cover, and a vent opening formed in one of said attachment legs,
wherein said valve cover extends outwardly beyond the entire perimeter of said opening and has a downwardly extending perimeter region encompassing an entire perimeter of said valve cover.

10. The contact tray as set forth in claim 9, wherein said valves are fixed valves and said first and second attachment legs support said valve cover at a fixed location above said opening and said weir.

11. The contact tray as set forth in claim 10, wherein each of said attachment legs extends through a slot in said tray deck and includes a shoulder that engages against an upper surface of said tray deck and a tab that has an upper surface spaced a preselected distance from said shoulder that engages against an under surface of said tray deck, wherein said preselected distance between said shoulder and said upper surface of the tab is selected to prevent vertical movement of said attachment legs and valve cover when the shoulders of the attachment legs engage the upper surface of the tray deck and said upper surfaces of said tabs engage against the under surface of the tray deck.

12. The contact tray as set forth in claim 9, wherein each of said attachment legs extends through and is vertically moveable within a slot in said tray deck to allow said valve cover to move between lowered and raised vertical positions, wherein each of said attachment legs includes a tab that has an upper surface that engages against an under surface of said tray deck to prevent further vertical movement of the attachment leg when the valve cover is in the raised vertical position.

13. The contact tray as set forth in claim 12, wherein an under surface of said tray cover contacts said weir when the valve cover is in the lowered position.

14. The contact tray as set forth in claim 9, wherein said opening is circular and said valve cover is in the form of an isosceles trapezoid with said attachment legs comprising first and second attachment legs respectively connected to opposed parallel first and second ends of said valve cover.

15. The contact tray as set forth in claim 14, wherein said first attachment leg is wider than said largest dimension of the opening and is located at an upstream side of said valve cover, and wherein said second attachment leg is less wide than said first attachment leg and is located at a downstream side of said valve cover, and wherein said fluid flows across said tray deck from said upstream side to said downstream side, and wherein said second attachment leg has the vent opening formed therein and a louver overhanging said vent opening.

16. A contact tray for use in a mass transfer column, said contact tray comprising:
a generally planar tray deck; and
a plurality of valves distributed across the tray deck, each of said valves comprising an opening that extends through the tray deck to allow for passage of fluid through the tray deck, a weir extending upwardly from the tray deck around an entire perimeter of the opening, a valve cover supported above said opening and said weir by first and second attachment legs positioned at opposite ends of said valve cover, and a vent opening formed in one of said attachment legs,
wherein said opening is circular and said valve cover is in the form of an isosceles trapezoid with said attachment legs comprising first and second attachment legs respectively connected to opposed parallel first and second ends of said valve cover,
wherein said valve cover has a downwardly extending perimeter region encompassing an entire perimeter of said valve cover, and said valve cover extends outwardly beyond the entire perimeter of the opening,
wherein said first attachment leg has a width greater than a largest width of the opening and is located at an upstream side of said valve cover, and wherein said second attachment leg is less wide than said first attachment leg and is located at a downstream side of said valve cover, and wherein said second attachment leg has the vent opening formed therein and a louver overhanging said vent opening.

17. The contact tray as set forth in claim 16, wherein each of said attachment legs extends through a slot in said tray deck and includes a shoulder that engages against an upper surface of said tray deck and a tab that has an upper surface spaced a preselected distance from said shoulder that engages against an under surface of said tray deck, wherein said preselected distance between said shoulder and said upper surface of the tab is selected to prevent vertical movement of said attachment legs and valve cover when the shoulders of the attachment legs engage the upper surface of the tray deck and said upper surfaces of said tabs engage against the under surface of the tray deck.

18. The contact tray as set forth in claim 16, wherein each of said attachment legs extends through and is vertically moveable within a slot in said tray deck to allow said valve cover to move between lowered and raised vertical positions, wherein each of said attachment legs includes a tab that has an upper surface that engages against an under surface of said tray deck to prevent further vertical movement of the attachment leg when the valve cover is in the raised vertical position.

19. The contact tray as set forth in claim 18, wherein an under surface of said tray cover contacts said weir when the valve cover is in the lowered position.

\* \* \* \* \*